Oct. 1, 1968 L. H. HAZLETT 3,404,285

BIAS SUPPLY AND LINE TERMINATION SYSTEM FOR DIFFERENTIAL LOGIC

Filed May 3, 1965 2 Sheets-Sheet 1

INVENTOR
LESTER H. HAZLETT

BY Cushman, Darby & Cushman
ATTORNEYS

Oct. 1, 1968 L. H. HAZLETT 3,404,285

BIAS SUPPLY AND LINE TERMINATION SYSTEM FOR DIFFERENTIAL LOGIC

Filed May 3, 1965 2 Sheets-Sheet 2

INVENTOR
LESTER H. HAZLETT

BY Cushman, Darby & Cushman
ATTORNEYS

United States Patent Office 3,404,285

Patented Oct. 1, 1968

3,404,285

BIAS SUPPLY AND LINE TERMINATION SYSTEM FOR DIFFERENTIAL LOGIC

Lester H. Hazlett, St. Paul, Minn., assignor to Control Data Corporation, Minneapolis, Minn., a corporation of Minnesota Filed May 3, 1965, Ser. No. 452,840
5 Claims. (Cl. 307—203)

ABSTRACT OF THE DISCLOSURE

Apparatus for supplying a bias in a system of logic circuits which provides differential logic signal outputs. Resistors are connected between each differential logic signal output and a common bus to form a reference voltage on the bus, this reference voltage being applied as a bias to the logic circuits.

Figure 1:
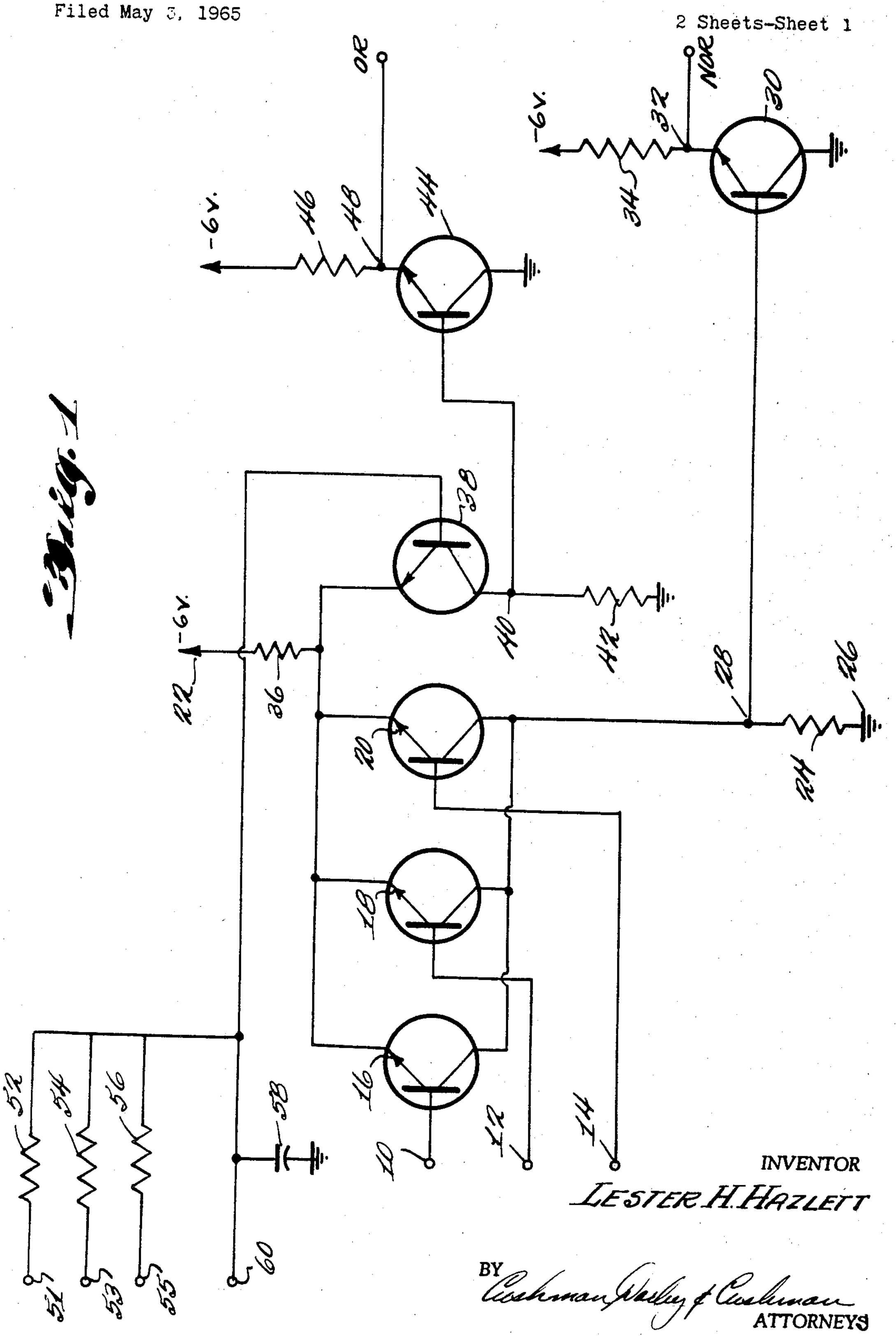

This invention relates in general to circuits, which require a bias voltage, and, more particularly, to means for providing the bias voltage for these circuits.

As an illustration of the invention, many computer operations require the use of differential logic circuits and to each of these circuits a bias voltage must be supplied to insure proper performance of the circuit. Heretofore, the source of this bias voltage has been external or removed from the area in which the differential logic circuits are located. Because the temperature or the humidity at the place where the source of the bias voltage is located may be different from the temperature or humidity at the location of the differential logic circuits, problems arise in insuring that the bias voltage maintains a fixed relation to the signal levels occurring at the differential logic circuits. Since there are normally only two signal levels associated with the logic circuits, it is normally preferable to maintain the bias voltage at substantially half-way between the voltage levels of the signals occurring at the logic circuits.

Another problem associated with differential logic circuits has been the dissipation or wasting of power in the terminating resistors of the signal lines of the logic circuits. That is, it is necessary to terminate each signal line in a system of differential logic circuits because the noise level within the system must be minimized. Signal lines which are not terminated in their characteristic impedance will introduce noise into the system, thereby making the system more prone to errors. Accordingly, it is an object of the invention to provide, for circuits requiring a bias, means for deriving the bias voltage from within the circuit itself as opposed to an external source.

It is another object of the invention to provide a source of bias voltage which is internal to a circuit requiring a bias voltage thereby generating a bias voltage which is advantageously self-compensating to fluctuations in voltage and temperature.

It is a further object of the invention to supply the bias voltage necessary for circuits requiring a bias voltage from the line signals of these circuits.

It is a further object of the invention to eliminate the necessity of providing an external voltage for supplying and distributing a bias voltage to circuits requiring a bias voltage.

It is a further object of the invention to provide means for maintaining the bias voltage of circuits requiring a bias voltage substantially halfway betwen the line voltage levels of the logic circuitry in spite of temperature or humidity variations at the circuitry.

Briefly, in one embodiment of the invention the afore-mentioned objects are accomplished by terminating the characteristic impedance of each of the signal lines of a system of differential logic circuitry to a common bus instead of to ground. The voltage at the common bus is the average of all the signals that are applied to it and this voltage is used to supply the bias voltage needed by the differential logic circuitry. At each circuit is provided means for maintaining the voltage at the common bus at a substantially constant level. This is advantageous since it minimizes noise that is injected into the bias supply due to signal transitions on the signal lines.

Figure 2:
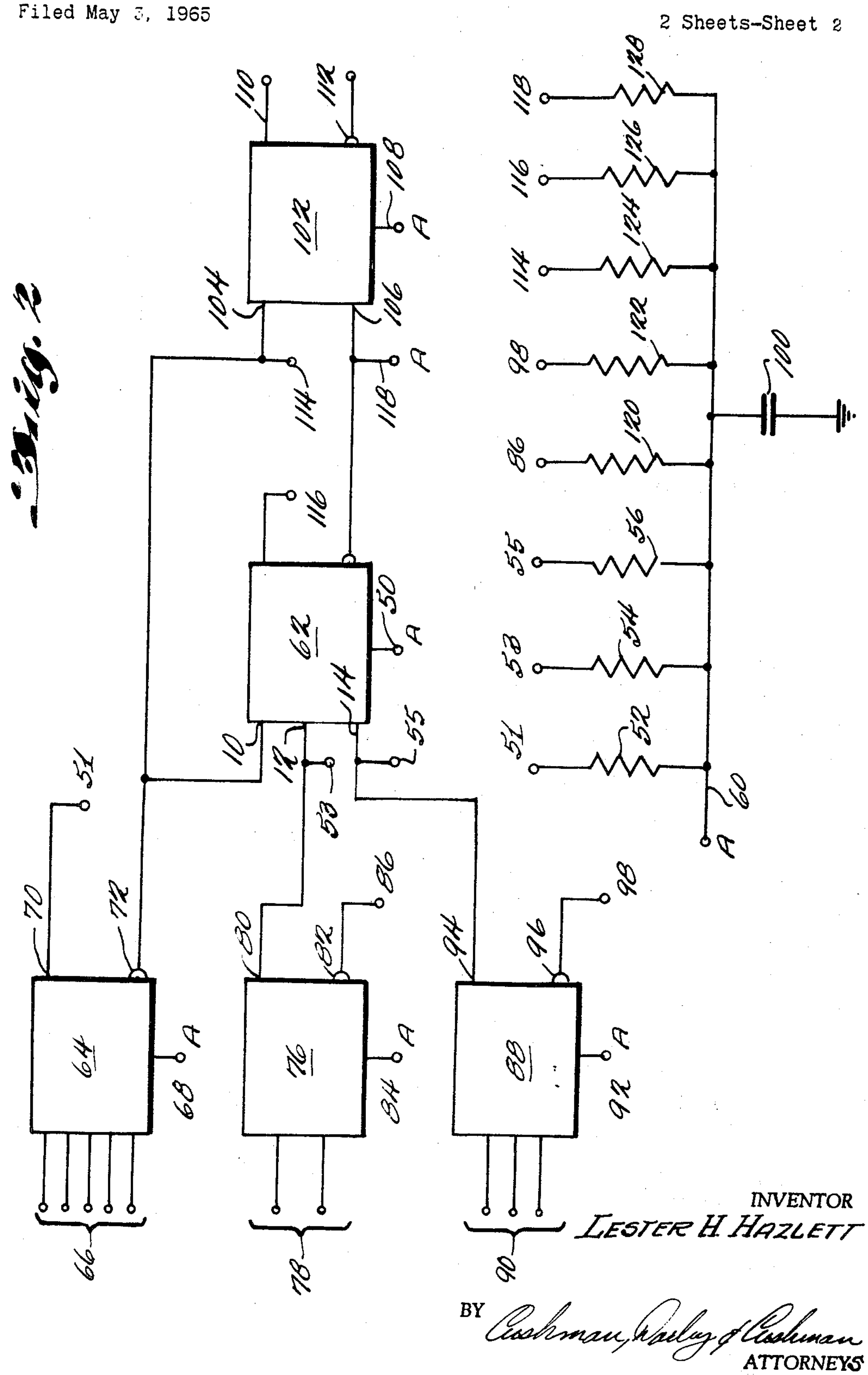

Other advantages and objects of this invention will become apparent after inspecting the accompanying specification, claims and drawing where:

FIGURE 1 shows an illustration of the invention in the form of a detailed circuit of a typical differential logic circuit employing OR-NOR logic and FIGURE 2 is a system configuration employing a plurality of the differential logic circuits shown in FIGURE 1.

Referring now to FIGURE 1, the operation of the OR-NOR differential logic circuit will be described. It must be emphasized that the invention is not restricted to OR-NOR logic. The invention applies to any circuit, which requires a bias voltage for proper performance.

The logic levels used in this illustrative circuit are —.8 volt representing a ONE and —1.6 volts representing a ZERO.

Returning to FIGURE 1, three inputs or input terminals 10, 12 and 14 are provided for transferring the input signals to transistors 16, 18 and 20. These transistors are all preferably NPN as is the case with the other transistors in the circuit of FIGURE 1. However, the transistors may all be of the PNP type if the bias voltage and supply voltare are properly adjusted. When at least one of the input terminals 10, 12 or 14 has an input signal present thereon, one of the transistors 16, 18 or 20 will be conducting. This will result in a current path from the power supply 22 (which is preferably shown as —6 volts, but which may be +6 volts if all the transistors are of the PNP type) through the conducting transistor and through the resistor 24 to ground 26. This causes a —.8 volt to appear at terminal 28, which in turn decreases the current through transistor 30 thereby causing the voltage level at NOR output or output terminal 32 to drop to —1.6 volts. Since the output signal at NOR output 32 decreased, this means that an OR condition was present on the input lines as originally hypothesized.

Since one of the transistors 16, 18 or 20 is conducting, the voltage drop across resistor 36 is fairly large thereby maintaining the transistor 38 in a cut-off condition and the voltage at terminal 40 at ground, there being no flow of current through resistor 42. This means that transistor 44 is conducting fairly heavy, and therefore the voltage difference across resistor 46 is large, the output signal at OR output terminal 48 being —.8 volt. This is the ONE condition indicating that there is at least one input signal at the input terminals 10, 12 or 14 as originally hypothesized.

When there are no input signals at any of the terminals 10, 12 or 14, none of the transistors 16, 18 or 20 conduct, and therefore the voltage at terminal 28 rises to ground. This increase in voltage is reflected in an increase in current through transistor 30, thereby increasing the voltage across resistor 34 and increasing the value of the voltage at output 32 from —1.6 volts to —.8 volt. This results in the ONE indication which is in agreement with the input conditions at terminals 10, 12 and 14.

Further, when the transistors 16, 18 and 20 are all turned off, the voltage across resistor 36 tends to decrease thereby turning on transistor 38. This results in the decrease of voltage at point 40 from ground to —.8 volt. This decrease in voltage causes transistor 44 to conduct less heavily, and therefore, the voltage at output 48 drops to −1.6 volts, thereby indicating the ZERO condition which is in agreement with the fact that there is no input signal present on any of the input lines. Preferably, transistors 30 and 44 are always conducting since this insures the highest possible speed of operation for the circuitry.

The bias voltage necessary for proper operation of the OR-NOR logic is supplied to the base of transistor 38 from the terminating resistors or terminations 52, 54 and 56 and the by-pass condenser 58. The terminating resistors and by-pass condenser 58 are all connected to common bus 60. Terminating resistor terminals 51, 53, and 55 are also provided.

In order to more fully understand how the invention supplies the bias voltage from the common bus 60, reference should now be made to FIGURE 2 where like parts of FIGURE 1 and FIGURE 2 have common reference numerals. Each block of FIGURE 2 represents a differential logic circuit which has been described in detail in FIGURE 1. The differential logic circuits have been interconnected to form the system of FIGURE 2 and thereby perform a relatively simple logic operation. The block 62 corresponds in particular to FIGURE 1, since it has three inputs and two outputs, as shown in FIGURE 1.

First note the block 64 which has five inputs 66, a bias input 68 and two logical outputs 70 and 72, which may be OR and NOR, respectively. The hump at the NOR output 72 indicates that this output is the inverse of the OR output 70. This is the case with differential logic circuits—that is, there are two outputs available and each of the outputs is always in a state opposite to the other output. The NOR output 72 is connected to input 10 of differential logic circuit 62 while the OR output 70 is not used.

Since the OR output 70 is no longer used, it must be terminated in its characteristic impedance to insure that no noise is introduced into the system thereby reducing the immunity of the system to noise. As has been noted before, the practice in the past has been to terminate the line from output 70 to ground, thereby causing needless dissipation and wasting of power in the terminating resistor. This shortcoming of prior art devices is overcome by connecting output 70 to terminating resistor 52, which is shown schematically in the terminating resistor network at the lower portion of FIGURE 2. Terminal 51 provides the connection of output 70 to common bus 60 through resistor 52, thereby providing one voltage source for the bias signal which is developed on the bus 60. The manner in which the bias voltage is developed from all of the output signals from all of the differential logic circuits will be described more fully hereinafter. Logic circuit 76 has two inputs 78, OR and NOR outputs 80 and 82, respectively, and bias voltage input 84. The OR output 80 is connected to the input 12 of circuit 62 and the NOR output 82 is connected to terminal 86, this output being used for no further purpose. Differential logic circuit 88 has three inputs 90, a bias voltage input 92 and OR and NOR outputs 94 and 96, respectively. The NOR output is connected to terminating resistor 98 immediately since it is used for no further purpose; whereas OR output 94 is connected to input 14 of logic circuit 62.

Note that the OR output 80 and the OR output 94 are not used again after providing an input signal to logic circuit 62 and, therefore, these lines are terminated to the common bus 60 through terminals 53 and 55, respectively. Note that these terminals 53 and 55 along with the terminal 51 connected to OR output 70 are all shown in FIGURE 1.

Associated with each of the differential logic circuits is a by-pass condenser 58, the purpose of which is to maintain the bias voltage on the common bus 60 at a substantially constant level. This will be discussed more fully hereinafter. In FIGURE 2 the by-pass condensers at each of the logic circuits are lumped together symbolically in by-pass condenser 100.

The NOR output 72, which is connected to input 10 of logic circuit 62, is not used for the last time at circuit 62 and, therefore, the signal line from output 72 is not terminated at one of the terminating resistors 52, 54 or 56 associated with logic circuit 62. Instead, NOR output 72 is also used as an input to logic circuit 102 having input terminals 104 and 106, bias voltage terminal 108, OR output terminal 110 and NOR output terminal 112. Now NOR output 72 is used for the last time at logic circuit 102 and therefore the signal line connected to NOR output 72 would be terminated to the common bus 60 through terminal 114. The OR output of logic circuit 62, which is not used for any purpose, is terminated immediately through terminal 116, and the NOR output of logic circuit 62, which is used for the last time at logic circuit 102, is terminated at logic circuit 102 through terminal 118.

Note that since all of the inputs to logic circuit 102 are used for the last time at circuit 102, both of the terminating resistors associated with logic circuit 102 are connected to the inputs that are used for the last time at logic circuit 102. In other words, generally the number of terminating resistors associated with a given differential logic circuit is equal to the number of input terminals to the logic circuit. This is so since all of the inputs to a given logic circuit may be used for the last time at the given logic circuit and, therefore, a number of terminating resistors equal to the number of inputs must be provided.

In order to more fully understand how the bias voltage is derived on common bus 60 from the OR and NOR outputs of the logic circuits 62, 64, 76 and 88, reference should be made to the terminating resistor network in the lower portion of FIGURE 2. As has been stated before, the outputs from each of the differential logic circuits are the inverse of each other. In other words, if the OR output from logic circuit 64 is −.8 volt, the NOR output will be −1.6 volts or vice versa. This is the situation at each of the four logic circuits 62, 64, 76 and 88, and therefore, the voltage input will be −.8 volt to four of the eight terminating resistors 52, 54, 56, 120, 122, 124, 126 and 128, whereas the voltage input will be −1.6 volts at the other four terminating resistors. Therefore, the voltage at common bus 60 will be approximately −1.2 volts since all of the terminating resistors are equal in value. The preferred value for the terminating resistors is 120 ohms.

Of course, there will be transitions in the voltage levels of the signals at the terminating resistors and, therefore, the voltage on common bus 60 tends to change. This is particularly due to the fact that the bus has an inductance associated with it. In order to clamp the bias voltage at the desired level, a by-pass condenser is provided with each of the logic circuits. This by-pass condenser is shown as condenser 58 in FIGURE 1 and all of the condensers associated with each of the logic circuits are symbolically lumped together in condenser 100 in FIGURE 2. The by-pass condensers have proved to be sufficient to overcome noise that tends to be injected into the bias supply during signal transitions.

Temperature variations at the logical circuitry tend to change the operating characteristics of the output transistors (transistors 30 and 44 of FIGURE 1, for example) of each of the logic circuits, and therefore, shift the signal or logic levels from, say, −1.6 volts and −.8 volt to −1.5 volts and −.7 volt. However, this causes no problem with the invention since the bias voltage or signal or common bus 60 would also be shifted to −1.1 volts thereby eliminating any possibility on the part of the bias supply circuit to cause the logic circuit to favor one logic level over the other. However, with prior art bias supplies which are external and physically removed from the locale of the differential logic circuitry, the temperature variations at the source of external bias supply might cause the external supply voltage to change in direction opposite from that caused by temperature conditions at the differential logic circuitry, and therefore, the probability of error or of favoring one logic level over the other is greatly increased.

Although the invention has been described in relation to differential logic circuits, it will be appreciated that the teachings of the invention can be applied whenever a circuit needs a bias voltage for proper performance and there are available signal lines which must be terminated in their characteristic impedances.

A table is given below which illustrates values of components that may be employed in the OR/NOR logic circuitry of FIGURE 1. However, these values are given only to illustrate values that may be used in a working embodiment and there is no intent to restrict my invention to these values.

| Component: | Value |
|---|---|
| Power supply **22** ____v__ | —6 |
| Resistor **24** | 180Ω |
| Resistor **34** | 1000Ω |
| Resistor **36** | 800Ω |
| Resistor **42** | 200Ω |
| Resistor **46** | 1000Ω |
| Resistors **52, 54, 56** | 120Ω |
| Capacitor **58** ____pf__ | 1200 |

While the invention has been described with reference to the preferred forms thereof, it will be understood by those skilled in the art after understanding the invention that modifications and changes may be made therein without departing from the spirit and scope of the invention as defined by the claims appended hereto.

What is claimed is:

1. In conjunction with a logic circuit of the type adapted to produce differential logic signal outputs in response to at least one logic signal input, wherein a bias voltage applied to a bias input of the logic circuit is utilized in producing the differential logic signal outputs, the improvement in supplying the bias voltage, comprising:

a common bus;

first resistance connected between one differential output of the logic circuit and the common bus;

second resistance connected between another differential output of the logic circuit and the common bus; and means for connecting the common bus to the bias input of the differential logic circuit for developing a bias voltage from the differential logic outputs.

2. The apparatus of claim 1, further comprising at least one capacitor connected between the common bus and ground.

3. The apparatus of claim 1, wherein each of said resistances has a value to terminate the circuit associated with its respective output in its characteristic impedance.

4. In a system of logic circuits wherein said circuits are of a type adapted to produce differential logic signal outputs in response to at least one logic signal input, and wherein each logic circuit utilizes a bias voltage for producing said outputs, one differential signal output voltage being greater than the bias voltage and one differential signal output voltage being less than the bias voltage, an improvement in the means for supplying the bias voltage, comprising:

a common bus;

a plurality of resistances, at least one resistance connected between each logic signal output and the bus for developing the bias voltage on the bus; and means for connecting the common bus to the logic circuits.

5. The apparatus of claim 4 wherein at least one differential logic signal output is connected to the logic signal input of at least two other logic circuits, and wherein the value of resistance connected between each differential logic signal output and the common bus comprises the characteristic impedance of the circuit associated with the individual differential logic output.

References Cited

UNITED STATES PATENTS

| | | | |
|---|---|---|---|
| 3,108,258 | 10/1963 | Eckl | 307—88.5 X |
| 3,219,845 | 11/1965 | Nieh | 307—88.5 |
| 3,249,769 | 5/1966 | Mierendorf | 307—88.5 |
| 3,259,761 | 7/1966 | Narud et al. | 307—88.5 |
| 3,283,180 | 11/1966 | Pressman | 307—88.5 |

ARTHUR GAUSS, *Primary Examiner.*

D. D. FORRER, *Assistant Examiner.*